United States Patent [19]

Balliett

[11] E Re. 29,038

[45] Reissued Nov. 16, 1976

[54] HIGH STRENGTH ZINC ALLOYS

[75] Inventor: Robert Wayne Balliett, Beaver Falls, Pa.

[73] Assignee: St. Joe Minerals Corporation, New York, N.Y.

[22] Filed: Jan. 8, 1976

[21] Appl. No.: 647,583

Related U.S. Patent Documents

Reissue of:

[64] Patent No.: 3,850,622
Issued: Nov. 26, 1974
Appl. No.: 358,275
Filed: May 8, 1973

[52] U.S. Cl. ..... 75/178 AM
[51] Int. Cl.[2] ..... C22C 17/00
[58] Field of Search..... 75/178 AM, 178 A, 178 AC

[56] References Cited

UNITED STATES PATENTS

| | | | |
|---|---|---|---|
| 1,945,288 | 1/1934 | Morell | 75/178 AM |
| 2,102,869 | 12/1937 | Winter | 75/178 AM |
| 3,527,601 | 9/1970 | Foerster | 75/178 A |
| 3,676,115 | 7/1972 | Hare et al. | 75/178 AM |
| 3,734,785 | 5/1973 | Watson et al. | 75/178 AM |
| 3,741,819 | 6/1973 | Chollet et al. | 148/11.5 R |

FOREIGN PATENTS OR APPLICATIONS

| | | | |
|---|---|---|---|
| 899,110 | 5/1972 | Canada | 75/178 |
| 663,274 | 8/1938 | Germany | 75/178 AM |
| 703,977 | 3/1941 | Germany | 75/178 AM |
| 1,272,117 | 4/1972 | United Kingdom | 75/178 |

*Primary Examiner*—L. Dewayne Rutledge
*Assistant Examiner*—E. L. Weise
*Attorney, Agent, or Firm*—Harold L. Stowell

[57] ABSTRACT

Zinc alloys having improved physical properties consist essentially of 10 to 30 percent by weight of aluminum, 0.3 to 10 percent by weight of copper, 0.01 to 0.1 percent by weight of magnesium, 0.005 to 0.3 percent by weight of at least one of the metals calcium, [ lithium ] and sodium, and the balance zinc.

1 Claim, No Drawings

HIGH STRENGTH ZINC ALLOYS

Matter enclosed in heavy brackets [ ] appears in the original patent but forms no part of this reissue specification; matter printed in italics indicates the additions made by reissue.

It has been known for over twenty-five years that near-eutectoid alloys of zinc and aluminum upon suitable heat treatment acquire the capacity for a high degree of plastic extension which has been termed "superplasticity." A review of the literature in the field of aluminum-zinc superplastic alloys is provided by an article entitled "Superplasticity in an Al-Zn Alloy" by W. A. Backofen et al. in Transactions of the ASM, Vol. 57, 1964, pages 980–990.

U.S. Pat. No. 1,945,288 to Morell disclosed eutectoid alloys of zinc and aluminum containing minor porportions of magnesium and copper. Although the Morrell patent did not explicitly describe the phenomenon of "superplasticity," it became very obvious from the literature in this field cited and discussed in the Backofen article referred to above that the alloys described in the Morell patent possessed the property of superplasticity.

It has now been found that alloys of improved physical properties including high ultimate tensile strengths at ambient temperatures, improved stress rupture lives, and high creep strengths as well as potential superplasticity can be obtained by adding to zinc-aluminum eutectoid alloys containing from 0.3 to 10 percent by weight of copper, and from 0.01 to 0.1 percent by weight of magnesium, small amounts, of the order of from 0.005 to 0.3 percent by weight of at least one of the metals calcium, [lithium] and sodium. The alloys of the invention contain from 10 to 30 percent by weight of aluminum, the balance being zinc.

For most purposes preferred alloys of the invention contain 20 to 24 percent by weight of aluminum, from about 0.75 to about 1.1 percent by weight of copper, from about 0.04 to about 0.05 percent by weight of magnesium, from about 0.01 to about 0.03 percent by weight of at least one of the metals calcium, [ lithium ] and sodium and the balance zinc.

The following are typical alloy compositions of the invention all parts being in percent by weight:

TABLE I

| No. | Al | Cu | Mg | Ca | Li | Na | Zn |
|---|---|---|---|---|---|---|---|
| 1 | 22 | 0.9 | 0.04 | 0.02 | — | — | Balance |
| [2 | 22 | 0.9 | 0.04 | — | 0.013 | — | Balance] |
| [3 | 22 | 0.9 | 0.04 | — | 0.032 | — | Balance] |
| 2 [4] | 22 | 0.9 | 0.04 | — | — | 0.007 | Balance |
| 3 [5] | 22 | 0.9 | 0.04 | — | — | 0.013 | Balance |

The high strength properties of the alloys of the invention can be developed by casting the molten alloy compositions into extrusion billets or rolling slabs. The billets and rolling slabs are then heat-treated between 275° C. and 380° C. to homogenize the material and are water quenched to produce the superplastic structure. The billets or slabs are then reheated to 260° C. and hot-extruded or hot-rolled into rods or sheets. The rods or sheets thus produced are then in condition to be formed into useful products by any of the methods known in the art of forming superplastic alloys.

The practical utilization of the alloys of the invention are not limited to uses involving superplasticity. Other applications of the alloys utilizing their excellent mechanical properties include such metal working techniques as forging (open die, closed die and precision) hot extrusion, impact extrusion, stamping, drawing and screw machine techniques.

The results of tensile strength tests on typical alloys of the invention are given below. In the table the term "hot-worked" denotes the as-rolled or as-extruded material and the term "heat-treated" denotes the material that has been heat-treated between 275° C. and 380° C. and water quenched. The numbered alloys are as in Table I.

TABLE II

| No. | Ultimate Tensile Strength (psi) Hot-Worked | Heat-Treated |
|---|---|---|
| 1 | 68,000 | 92,500 |
| [2 | 69,000 | 72,000] |
| [3 | 70,000 | 70,000] |
| [4] 2 | 60,000 | 82,000 |
| [5] 3 | 60,000 | 80,000 |

Comparative ultimate tensile strengths of an alloy consisting of 22 percent by weight of aluminum, 0.9 percent by weight of copper, 0.04 percent by weight of magnesium and balance zinc were 53,000 psi in the hot-worked state and 62,000 psi in the heat-treated state.

I claim:

[ 1. Zinc base alloys having improved mechanical properties consisting essentially of 20 to 24 percent by weight of aluminum, 0.3 to 10 percent by weight of copper, 0.01 to 0.1 percent by weight of magnesium, 0.005 to 0.3 percent by weight of at least one of the metals calcium, lithium and sodium, and the balance zinc. ]

2. Zinc base alloys [ as defined in claim 1 ] *having improved mechanical properties* consisting essentially of 20 to 24 percent by weight of aluminum, 0.75 to 1.1 percent *by weight* of copper, 0.04 to 0.05 percent by weight of magnesium, 0.01 to 0.03 percent by weight of calcium and balance zinc.

[3. Zinc base alloys as defined in claim 2 in which the calcium is replaced by lithium.]

[4. Zinc base alloys as defined in claim 2 in which the calcium is replaced by sodium.]

* * * * *